(12) United States Patent
Kang

(10) Patent No.: US 8,042,635 B2
(45) Date of Patent: Oct. 25, 2011

(54) FRONT END MODULE OF A VEHICLE

(75) Inventor: Tae Han Kang, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 489 days.

(21) Appl. No.: 12/019,133

(22) Filed: Jan. 24, 2008

(65) Prior Publication Data

US 2009/0140552 A1 Jun. 4, 2009

(30) Foreign Application Priority Data

Nov. 30, 2007 (KR) .................. 10-2007-0123560

(51) Int. Cl.
*B60K 11/04* (2006.01)
(52) U.S. Cl. .................................. 180/68.4; 180/311
(58) Field of Classification Search .................. 180/312, 180/311, 68.6, 68.4; 165/41, 149
See application file for complete search history.

(56) References Cited

U.S. PATENT DOCUMENTS

| | | | | |
|---|---|---|---|---|
| 2,077,090 A | * | 4/1937 | Bonny | 5/112 |
| 2,568,584 A | * | 9/1951 | Hartman | 411/525 |
| 3,295,627 A | * | 1/1967 | Fleck et al. | 180/68.4 |
| 5,658,041 A | * | 8/1997 | Girardot et al. | 296/193.09 |
| 5,794,953 A | * | 8/1998 | Duchene et al. | 280/33.992 |
| 5,988,678 A | * | 11/1999 | Nakamura et al. | 280/751 |
| 6,547,317 B1 | * | 4/2003 | Cheron et al. | 296/193.01 |
| 7,287,613 B2 | * | 10/2007 | Kim | 180/68.4 |
| 7,338,191 B2 | * | 3/2008 | Konno et al. | 362/507 |
| 7,377,579 B2 | * | 5/2008 | Kwon | 296/193.09 |
| 7,571,957 B2 | * | 8/2009 | Povinelli et al. | 296/193.09 |
| 2002/0014322 A1 | * | 2/2002 | Ozawa et al. | 165/41 |
| 2002/0070062 A1 | * | 6/2002 | Joutaki et al. | 180/68.4 |
| 2005/0252704 A1 | * | 11/2005 | Kim | 180/68.4 |
| 2006/0033364 A1 | * | 2/2006 | Lee | 296/203.02 |
| 2006/0072008 A1 | * | 4/2006 | Miyazaki et al. | 348/118 |
| 2006/0207815 A1 | * | 9/2006 | Vandekerkhof | 180/68.4 |
| 2008/0099641 A1 | * | 5/2008 | Best et al. | 248/220.22 |

* cited by examiner

*Primary Examiner* — Paul N Dickson
*Assistant Examiner* — Tashiana Adams
(74) *Attorney, Agent, or Firm* — Morgan, Lewis & Bockius LLP

(57) ABSTRACT

Safety of passengers may be improved by a front end module of a vehicle that includes: a front end module carrier that extends transversely in front of a vehicle a front end module carrier that extends transversely in front of a vehicle engine compartment and forms a frame for mounting vehicle accessory part; and an intercooler assembly that cools an air that is drawn into an engine, wherein the intercooler assembly is assembled with a bottom of the lower member of the front end module carrier.

11 Claims, 3 Drawing Sheets

FRONT END MODULE OF A VEHICLE

CROSS-REFERENCE TO RELATED APPLICATION

This application claims priority to and the benefit of Korean Patent Application No. 10-2007-0123560 filed in the Korean Intellectual Property Office on Nov. 30, 2007, the entire contents of which are incorporated herein by reference.

BACKGROUND OF THE INVENTION (a) Field of the Invention

The present invention relates to a vehicle, and more particularly, a front end module mounted with an intercooler assembly.

(b) Description of the Related Art

In front of an engine compartment of a vehicle, accessory parts such as a radiator, an aircon condenser, and a cooling fan to cool them are mounted at a carrier, and the unit is called a front end module.

For an engine equipped with a turbocharger, an intercooler is typically employed in order to cool the air drawn into the engine, and this intercooler is usually mounted in the front end module.

As such, various parts are mounted at a front end of a vehicle, and an arrangement scheme substantially affects a collision safety of occupants of a vehicle.

Upon a collision, the parts in the front end module may push the engine toward a passenger room. When the collision is strong, the engine may push a dash panel between the engine compartment and the passenger room, which is a dangerous situation for occupant's safety.

Therefore, the arrangement scheme of the parts in the front end module may substantially affect the driver's safety of the vehicle, and thus, a design of the front end module may be an important factor for a vehicle to become safer.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a front end module including an intercooler assembly of a vehicle having advantages of providing an improved safety to an occupant.

An exemplary embodiment of the present invention provides a front end module of a vehicle that includes: a front end module carrier that extends transversely in front of a vehicle engine compartment and forms a frame for mounting vehicle accessory parts; and an intercooler assembly that cools an air that is drawn into an engine, wherein the intercooler assembly is assembled with a bottom of the lower member of the front end module carrier.

The intercooler assembly may be assembled with the bottom of the lower member by at least a bracket unit.

The bracket unit may include: a first bracket fixed to a top of the lower member of the front end module carrier; and a second bracket fixed to a top of the intercooler assembly.

The second bracket may include an insertion column that protrudes upward, and an insertion plate that is formed at a top of the insertion column and is of a bigger size than the insertion column; and the first bracket may include an insertion hole that is of a size that can receive the insertion plate of the second bracket, and an insertion slot that extends from the insertion hole and is formed of a width that is smaller than that of the insertion hole and larger than that of the insertion column.

The insertion slot may extend from the insertion hole in a direction toward a front of the vehicle.

The exemplary front end module of a vehicle may further include: a radiator core for cooling a coolant; and at least a radiator tank that is assembled with a lateral side of the radiator core, wherein the intercooler assembly is assembled with the radiator tank.

At least a curved slot may be formed at a lower portion of the radiator tank; and the intercooler assembly may include at least an insertion protrusion that is inserted in the curved slot.

The curved slot may include a vertical slot portion formed in a vertical direction along the radiator tank and a horizontal slot portion extending from a distal end portion of the vertical slot portion in a horizontal direction; and the insertion protrusion may be engaged at a distal end portion of the horizontal slot portion by moving after being inserted in the vertical slot portion.

A supporting protrusion for supporting the insertion protrusion may be formed at the horizontal slot portion.

According to a front end module of a vehicle of the exemplary embodiment of the present invention, a safety of an occupant may be improved.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF REFERENCE NUMERALS INDICATING PRIMARY ELEMENTS IN THE DRAWINGS

Figure 1:
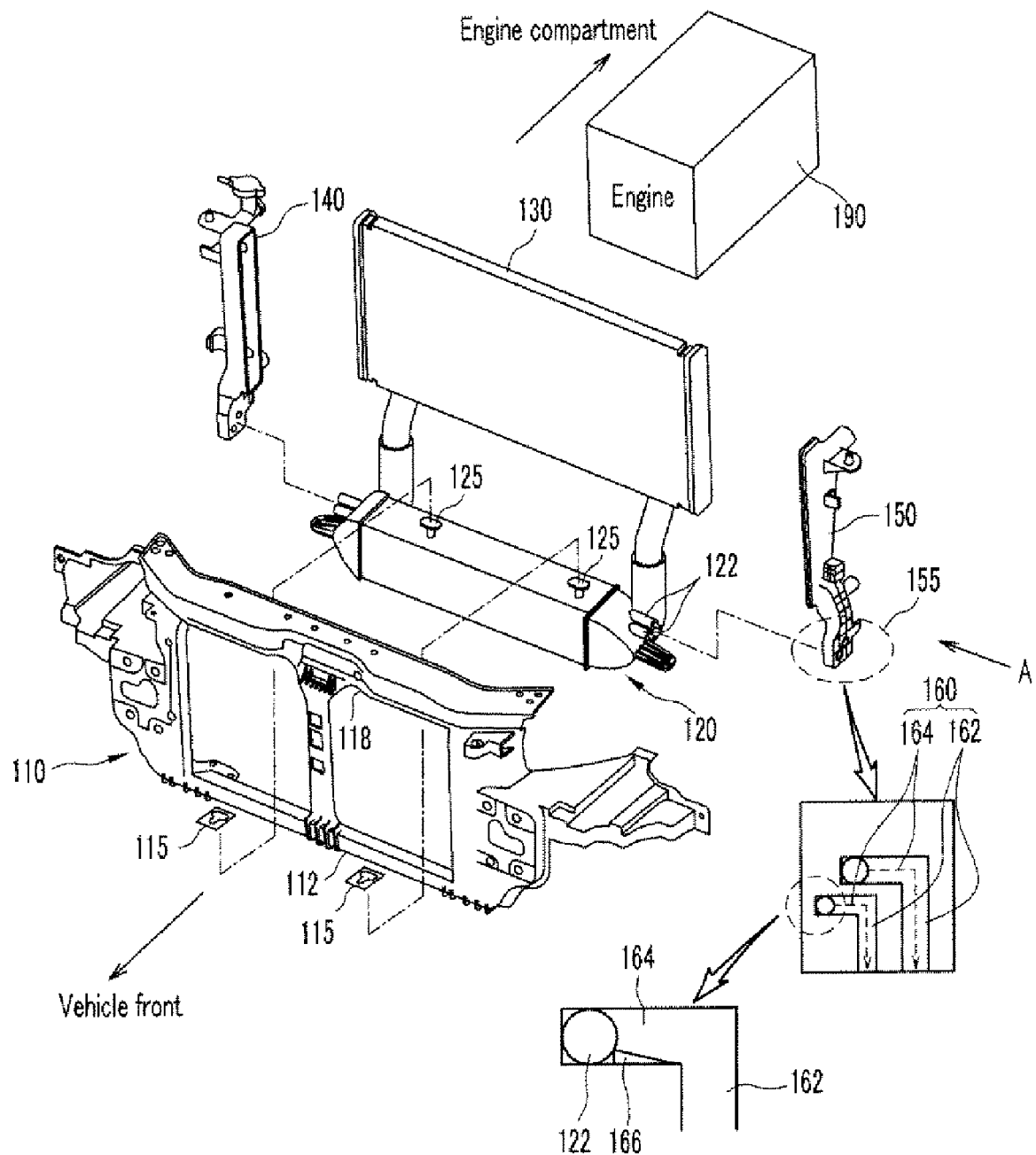
FIG. 1 is an exploded view of a front end module of a vehicle according to an exemplary embodiment of the present invention.

| | |
|---|---|
| 110: front end module carrier | 112: lower member |
| 115: first bracket | 125: the second bracket |
| 120: intercooler assembly | 122: insertion protrusion |
| 130: radiator core | |
| 140: left radiator tank | 150: right radiator tank |
| 160: curved slot | |
| 162: vertical slot portion | 164: horizontal slot portion |
| 166: supporting protrusion | |
| 190: engine | |
| 351: insertion column | 352: insertion plate |
| 361: insertion hole | 362: insertion slot |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is an exploded view of a front end module of a vehicle according to an exemplary embodiment of the present invention.

As shown in FIG. 1, a front end module of a vehicle according to an exemplary embodiment of the present invention includes a front end module carrier 110, and an intercooler assembly 120. The front end module carrier 110 extends transversely in front of a vehicle engine compartment and forms a frame for mounting vehicle accessory parts such as an intercooler assembly 120 and a radiator core 130, and the intercooler assembly 120 cools an air drawn into an engine 190.

The intercooler assembly 120 is assembled with a lower member 112 of the front end module carrier 110, below the lower member 112.

Since the intercooler assembly 120 is assembled with the lower member 112 of the front end module carrier 110 from below thereof the lower member 112 may be positioned higher than a conventional position. Therefore, the front end module carrier 110 is strengthened, and strength of a vehicle body is increased.

In more detail, the intercooler assembly 120 may be integrally fixed with the lower member 112. However, in this case, the intercooler assembly 120 can not disassembled from the lower member 112 at a collision of the vehicle, and therefore, the impact may be transmitted to the passenger room since the intercooler assembly 120 pushes the engine 190. A thickness of the intercooler assembly 120 may be designed to be smaller in order to solve such a problem. However, this causes deterioration of cooling performance of the intercooler assembly 120.

Therefore, according to an exemplary embodiment of the present invention, the intercooler assembly 120 is fitted to the lower member 112 from below thereof, through a bracket unit that is later described in detail.

Since the intercooler assembly 120 is fitted to the lower member 112, the intercooler assembly 120 may be disassembled from the lower member 112 at a collision of the vehicle, and therefore, a space that may absorb the collision impact is formed in the engine compartment in the case of collision.

The bracket unit according to an exemplary embodiment of the present invention includes a first bracket 115 fixed to a top of the lower member 112, and a second bracket 125 fixed to a top of the intercooler assembly 120.

Although the first bracket 115 is shown to be apart from the lower member 112 in the drawing, it should be understood that it is for better understanding, and the first bracket 115 is fixed to the lower member 112 at a bottom thereof.

Figure 2:
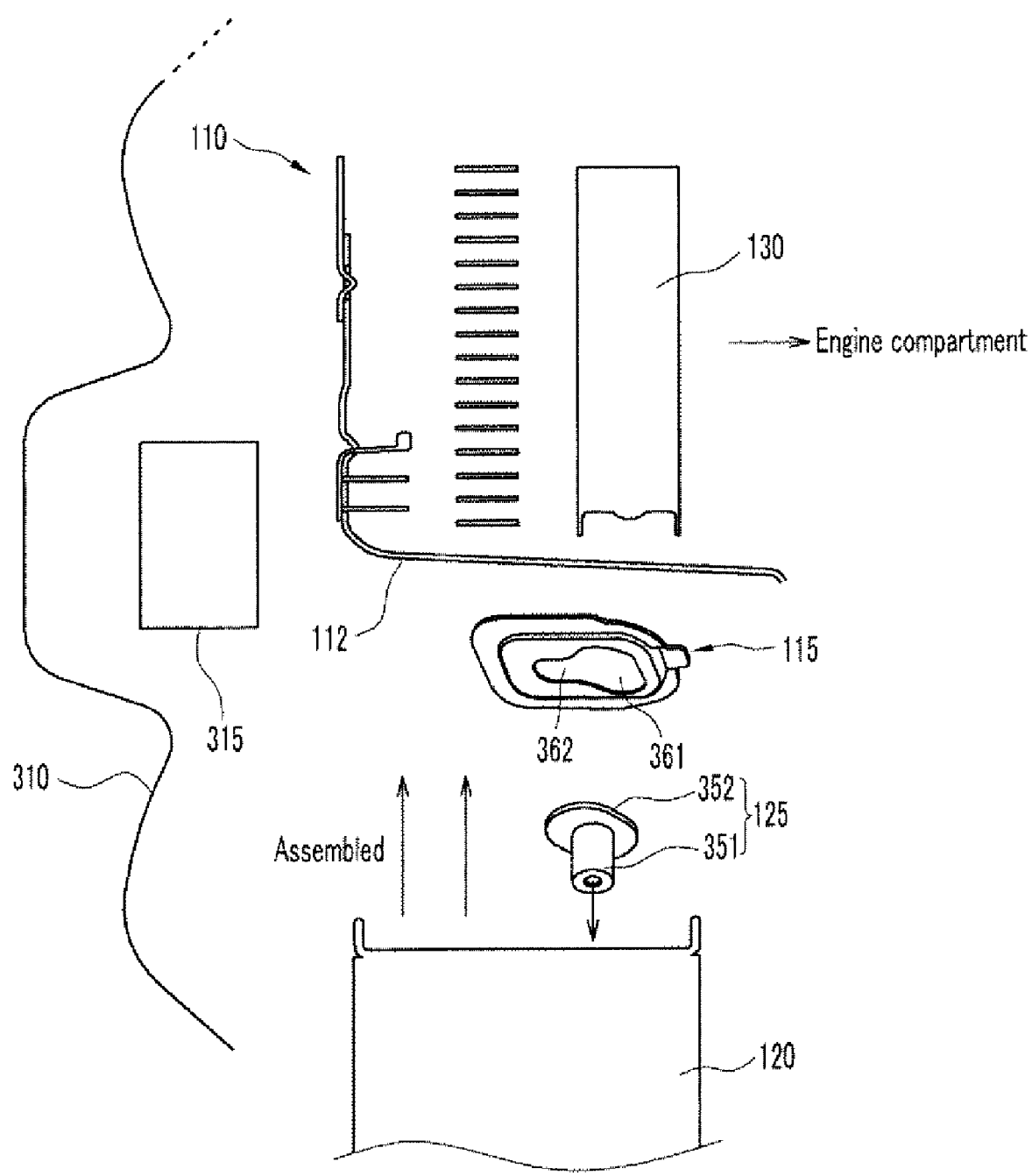
FIG. 2 is a lateral view along an A direction of FIG. 1.

As shown in FIG. 2, the second bracket 125 includes an insertion column 351 and an insertion plate 352. The insertion column 351 protrudes upward from the intercooler assembly 120. The insertion plate 352 is formed at a top of the insertion column 351 and is of a larger size than diameter of the insertion column 351.

The first bracket 115 includes an insertion hole 361 and an insertion slot 362. The insertion hole 361 is of a size that can receive the insertion plate 352 of the second bracket 125. The insertion slot 362 extends from the insertion hole 361 and is formed of a width that is smaller than that of the insertion hole 361 and larger than the diameter of the insertion column 351.

Figure 3:
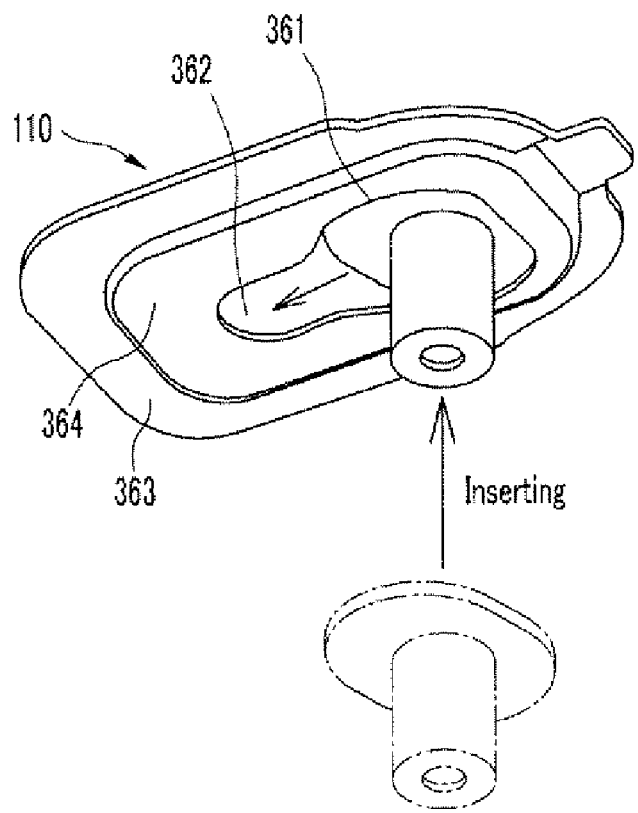
FIG. 3 illustrates how an intercooler assembly is assembled with a lower member of a front end module according to an exemplary embodiment of the present invention.
Figure 3:
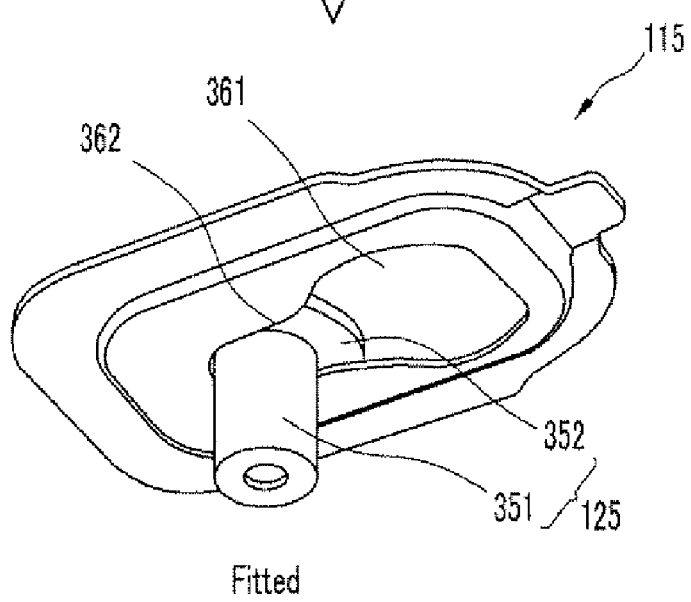

Furthermore, as an exemplary embodiment of the present invention, the first bracket 115 comprises a base plate 363 and a supporting plate 364 wherein the supporting plate 364 is stacked on the base plate 363 as shown in FIG. 3. The insertion hole 361 and the insertion slot 362 are positioned on the supporting plate 364.

A guide channel (not shown) is disposed between the base plate 363 and the supporting plate 364 to guide the insertion column 351 of the second bracket 125 along the insertion slot 362.

The insertion slot 362 extends from the insertion hole 361 in a direction toward a front of the vehicle.

In FIG. 2, a reference numeral 310 indicates a front bumper of the vehicle, a reference numeral 315 indicates a back beam that absorbs an impact at a rear of the front bumper 310.

FIG. 3 illustrates how the intercooler assembly 120 is assembled with the lower member 112 of the front end module 110 through the first and second brackets 115 and 125.

As shown in FIG. 3, the insertion plate 352 of the second bracket 125 is inserted in the insertion hole 361 of the first bracket 115, and then, the second bracket 125 is moved in a direction toward a vehicle front. Therefore, the insertion plate 352 of the second bracket 125 is secured at above the insertion slot 362 of the first bracket 115.

Accordingly, the intercooler assembly 120 is assembled to the lower member 112 in a direction toward the vehicle front during the course of the assembling. Therefore, the intercooler assembly 120 may be disassembled from the lower member 112 in the case of a collision, since the intercooler assembly 120 is forced toward a rear of the vehicle. Therefore, in the case of a collision, more safety zone can be obtained since the intercooler assembly 120 is disassembled from the lower member 112 and is dropped downward.

In addition, since the intercooler assembly 120 is assembled with the lower member 112 of the front end module carrier 110 by fitting or inserting with a use of a bracket unit, the intercooler assembly 120 may be disconnected with the lower member 112 by a breakage of the insertion column 351, even if the intercooler assembly 120 is not disassembled from the lower member 112 upon a collision.

Referring back to FIG. 1, a front end module of a vehicle according to an exemplary embodiment of the present invention includes a radiator core 130 for cooling a coolant, and left and right radiator tanks 140 and 150 that are assembled with a lateral side of the radiator core 130. The intercooler assembly 120 is assembled with lower portions of the radiator tanks 140 and 150 for example.

Since the intercooler assembly 120 is also assembled with the left and right radiator tanks 140 and 150, the intercooler assembly 120 can be more stably mounted in the front end module.

At least a curved slot 160 is formed at a lower portion of the left and right radiator tanks 140 and 150, and the intercooler assembly 120 includes at least an insertion protrusion 122 that is inserted in the curved slot 160 of the left and right radiator tanks 140 and 150.

The curved slot 160 includes a vertical slot portion 162 formed in a vertical direction and a horizontal slot portion 164 extending from the upper end of vertical slot portion 162 in a horizontal direction. The insertion protrusion 122 is engaged at the horizontal slot portion 164 by moving after being inserted in the vertical slot portion 162.

Although the engagement of the intercooler assembly 120 with the right radiator tank 150 is shown in detail by an enlarged view in the drawing, the intercooler assembly 120 may be engaged with the left radiator tank 150 in the same scheme.

A supporting protrusion 166 for supporting the insertion protrusion 122 is formed substantially at end portion of the horizontal slot portion 164. Therefore, when the insertion protrusion 122 of the intercooler assembly 120 is located at the curved slot 160 of the radiator tanks 140 and 150, the insertion protrusion 122 may remain at its location more stably unless a very large impact such as a collision of vehicles is applied.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A front end module of a vehicle, comprising:
   a front end module carrier that extends transversely in front of a vehicle engine compartment and forms a frame for mounting vehicle accessory parts;
   an intercooler assembly that cools an air that is drawn into an engine, wherein the intercooler assembly is positioned below the lower member of the front end module carrier;
   a radiator core for cooling a coolant; and
   at least a radiator tank that is assembled with a lateral side of the radiator core;
   wherein the intercooler assembly is assembled with a lower portion of the radiator tank.

2. The front end module of claim 1, wherein the intercooler assembly is assembled with the bottom of the lower member by at least a bracket unit.

3. The front end module of claim 2, wherein the bracket unit comprises:
   a first bracket fixed to a top of the lower member of the front end module carrier; and
   a second bracket fixed to a top portion of the intercooler assembly.

4. The front end module of claim 3, wherein:
   the second bracket comprises an insertion column that protrudes upward from the intercooler assembly, and an insertion plate that is formed at a top of the insertion column and is of a larger size than the diameter of the insertion column; and
   the first bracket comprises an insertion hole that is of a size that can receive the insertion plate of the second bracket, and an insertion slot that extends from the insertion hole and is formed of a width that is smaller than that of the insertion hole and larger than the diameter of the insertion column.

5. The front end module of claim 4, wherein the first bracket further comprises:
   a base plate; and
   a supporting plate stacked on the base plate; and
   a guiding channel that is positioned between the base plate and the supporting plate and guides the insertion column of the second bracket along the insertion slot.

6. The front end module of claim 4 or 5, wherein the insertion slot extends from the insertion hole in a direction toward a front of the vehicle.

7. The front end module of claim 1, wherein:
   at least a curved slot is formed at a lower portion of the radiator tank; and
   the intercooler assembly comprises at least an insertion protrusion that is inserted in the curved slot.

8. The front end module of claim 7, wherein:
   the curved slot comprises a vertical slot portion formed in a vertical direction along the radiator tank and a horizontal slot portion extending from a distal end portion of the vertical slot portion in a horizontal direction; and
   the insertion protrusion is engaged at a distal end portion of the horizontal slot portion by moving after being inserted in the vertical slot portion.

9. The front end module of claim 8, wherein at least a supporting protrusion for supporting the insertion protrusion is formed at the horizontal slot portion.

10. The front end module of claim 9, wherein the supporting protrusion is sewtooth-shaped to permit one directional movement of the insertion protrusion in a direction toward a front of the vehicle.

11. The front end module of claim 1, wherein the intercooler assembly is assembled downwards to a bottom of the lower member of the front end module carrier and detachably coupled thereto in a forward direction of the vehicle such that the intercooler is decoupled from the lower member when an external force is applied to the vehicle beyond a predetermined amount.

* * * * *